Patented Feb. 7, 1939

2,145,960

UNITED STATES PATENT OFFICE 2,145,960

COLOR PHOTOGRAPHY

Christopher William Crouch Wheatley and Christopher Cameron Hope Wheatley, Kent, England No Drawing. Application October 20, 1937, Serial No. 170,020. In Great Britain October 27, 1936

7 Claims. (Cl. 95—7)

This invention relates to color photography, and has reference to the preparation of paper or the equivalent for the direct production of colored prints, for example, by contact printing from a colored transparency.

In this connection the use has been proposed of certain dyes in conjunction with anethole and/or thiosinamine, but in such cases a very long period of exposure is required for printing and the resulting print is by no means permanent.

According to the present invention, there are distributed over the paper a dye or dyes of different colors, preferably consisting of or including the three primary colors of white light, and an accelerating agent rendering each dye liable to rapid bleaching by light of the colors it absorbs. Preferably the dyes are arranged to form an approximately black mixture which is evenly deposited over the paper, and are capable of oxidation to substantially white or colorless compounds. Thus supposing the dyes to be red, blue and yellow; where a patch of red light falls on the treated paper the blue and yellow dyes will absorb it and fade rapidly in the presence of the accelerator, so that only the red dye remains. Other colors will produce the appropriate effects in a similar manner, and where no light falls on the paper the dye mixture is unaffected and a black shadow is reproduced. A true color print will therefore rapidly be formed, and since the dyes may be fast to light in the absence of the accelerating agent the print may be rendered permanent by washing off the latter.

As regards the accelerating agent used, we have found that certain compounds of molybdenum and allied metals will serve this purpose; for example the accelerating agent may comprise an oxide of, or a salt containing, molybdenum, chromium, tungsten or uranium, in admixture or combination with an acid, preferably boric acid or an organic acid. In particular, oxalic, tartaric, lactic, citric and salicylic acids appear suitable in this connection.

A specific compound which has given very good results as an accelerating agent is oxal-molybdic acid, prepared from ammonium molybdate and oxalic acid, and since this substance may readily be washed from the print by water, it is particularly useful in association with alcohol-soluble dyes.

Further features of the invention will be apparent from the following description of one particular method of putting it into practice.

A collodion solution is made up by adding first 65 cc. of ether to 3 grams of gun cotton, and then 25 cc. of a 10% solution of thiosinamine (allyl thiocarbamide) in alcohol. This mixture is agitated if necessary until it forms a clear solution.

The accelerating agent is then prepared in the following way:—

A fairly dilute solution of ammonium molybdate in distilled water is filtered to remove any insoluble particles. The molybdate is then precipitated by the addition of industrial alcohol and filtered off.

The finely divided ammonium molybdate thus obtained is slowly added, with continual stirring, to 20 cc. of a 5% solution of oxalic acid in alcohol until the solution exhibits a persistent cloudiness, and the solution is then cleared by adding another 30 cc. of the oxalic acid solution.

From the 50 cc. of solution thus obtained, 25 cc. are added to the collodion solution above mentioned; this mixture is thoroughly agitated and a further 5 cc. of the oxalic acid-alcohol solution added. An additional quantity of about 2 grams of thiosinamine may also be added at this time.

It may be mentioned that this thiosinamine, as well as that previously incorporated in the collodion solution, may be omitted; its presence may shorten the time required for printing as compared with the use of the oxal-molybdic compound alone, but the difference is not substantial.

The solution of collodion and accelerating agent thus prepared is very sensitive to light and must be kept in the dark, otherwise a brown deposit containing a lower oxide of molybdenum will appear.

A dye mixture which has proved satisfactory contains

Aurine (yellow)
Brilliant Cresyl Blue
Acid Fuschine (red)

this being made up to an approximately black mixture (with the addition of some acid black dye if necessary) and dissolved in alcohol. It appears that many dyes of the di- and triphenyl methane, azine, oxazine, thiazine, phthalein and induline types may be used. It is preferable to use acid dyes for obtaining the sharpest prints, but basic dyes may be employed; in the particular example given above the Brilliant Cresyl Blue is a basic dye. Where acid and basic dyes are used together, care must be taken to see that one does not precipitate the other as the solution is made up.

The collodion-accelerator solution and the dye solution having been thus prepared, the paper is coated with the collodion and allowed to dry in the dark, and is then treated with the dye mixture (warmed if necessary) until the desired depth of shade is obtained.

This coating procedure may of course be varied in different ways; for example, the dyes may be applied separately, or one dye applied before a mixture of the others, the collodion being applied before, after, or at an intermediate stage in such progressive dyeing. Alternatively the collodion and dye solutions may be mixed and the whole applied simultaneously. However, the procedure first mentioned is preferred as it appears to allow a better regulation of the tint of the paper and to give deeper colors in the print.

The collodion film formed on the paper may be extremely thin and yet hold an adequate quantity of dye and be of a deep shade. Moreover a sharp reproduction of minute detail is obtained. It is possible to use gelatine emulsions instead, but with these the depth of color is not usually as good and there is a possibility of "bleeding" of the dyes and the diffusion of one color into another in the prints obtained.

The paper used is preferably baryta-covered as it absorbs very little of the deposited substances and gives a strong white foundation for the print.

Printing paper prepared as above described may be stored in the dark without any special precautions as to packing, since it is clean to handle and has no trace of stickiness. It will retain its sensitivity for at least six months.

Prints may be made by forming on it the direct image of a scene in a camera obscura arrangement or, more usually, by contact printing from a colored transparency. After the requisite exposure a print is washed to remove the accelerating agent and then treated with a fixing solution having a mordanting action on the dyes used. For example, the print may be treated with a warm solution of barium chloride and hydrobromic acid to mordant the acid dyes and decompose residual thiosinamine (if any), and then with a warm standard mordanting solution of tannic acid and tartar emetic.

If all the dyes are acid dyes, only the first-mentioned solution need be used; if on the other hand they are triphenyl methane dyes of the basic type a mixture of phospho-molybdic and phospho-tungstic acids may be used for fixing.

It will be understood that the particular method of preparation above described may be varied according to requirements without thereby departing from the invention. For instance, there are indications that the incorporation of suitable simple or complex cyanides in the accelerating agent may be advantageous in some circumstances.

Also, although reference has been made to the even distribution of the dyes over the paper, it may be that for certain classes of work the dyes could be more economically applied by printing machinery in the form of fine dotted, striated or other regular patterns.

In every case, of course, it is possible to start with colored paper instead of white paper, provided that the dye thereon is affected as required by the accelerating agent.

What I claim and desire to secure by Letters Patent of the United States is:

1. In a photographic bleaching-out dye layer, a bleaching accelerator comprising a compound of a metal selected from the group consisting of molybdenum, chromium, tungsten and uranium.

2. In a photographic bleaching-out dye layer, a bleaching accelerator comprising ammonium molybdate.

3. In a photographic bleaching-out dye layer, a bleaching accelerator according to claim 1 in association with an acid.

4. In photographic bleaching-out dye layer, a bleaching accelerator according to claim 1 in association with an organic acid.

5. In a photographic bleaching-out dye layer, a bleaching accelerator according to claim 1 in association with an acid selected from the group consisting of oxalic, tartaric, lactic, citric and salicylic acids.

6. In a photographic bleaching-out dye layer, a bleaching accelerator comprising oxal-molybdic acid.

7. In a photographic bleaching-out dye layer, a bleaching accelerator according to claim 1 and including allyl thiocarbamide (thiosinamine).

CHRISTOPHER WILLIAM
   CROUCH WHEATLEY.
CHRISTOPHER CAMERON
   HOPE WHEATLEY.